United States Patent
Chithambaram et al.

(10) Patent No.: US 7,142,205 B2
(45) Date of Patent: Nov. 28, 2006

(54) SINGLE GESTURE MAP NAVIGATION GRAPHICAL USER INTERFACE FOR A PERSONAL DIGITAL ASSISTANT

(75) Inventors: Nemmara Chithambaram, Novato, CA (US); Robin Warner Dandridge, Albany, CA (US); John Ricardo DeAguiar, Sebastopol, CA (US)

(73) Assignee: Autodesk, Inc., San Rafael, CA (US)

( * ) Notice: Subject to any disclaimer, the term of this patent is extended or adjusted under 35 U.S.C. 154(b) by 165 days.

(21) Appl. No.: 09/795,890

(22) Filed: Feb. 28, 2001

(65) Prior Publication Data

US 2001/0045949 A1    Nov. 29, 2001

Related U.S. Application Data

(63) Continuation-in-part of application No. 09/629,117, filed on Jul. 31, 2000, and a continuation-in-part of application No. 09/629,115, filed on Jul. 31, 2000, and a continuation-in-part of application No. 09/628,851, filed on Jul. 31, 2000, and a continuation-in-part of application No. 09/628,850, filed on Jul. 31, 2000.

(60) Provisional application No. 60/193,862, filed on Mar. 30, 2000, provisional application No. 60/193,153, filed on Mar. 29, 2000, provisional application No. 60/193,142, filed on Mar. 29, 2000, provisional application No. 60/193,141, filed on Mar. 29, 2000.

(51) Int. Cl.
*G06T 15/00* (2006.01)

(52) U.S. Cl. .................. 345/418; 345/711; 345/810; 715/530

(58) Field of Classification Search ............ 345/711, 345/810, 173, 619; 701/201; 702/2; 715/530, 715/515
See application file for complete search history.

(56) References Cited

U.S. PATENT DOCUMENTS

| | | | |
|---|---|---|---|
| 5,231,584 A | | 7/1993 | Nimura et al. ............. 701/202 |
| 5,559,707 A | | 9/1996 | DeLorme et al. ........... 701/200 |
| 5,615,384 A | * | 3/1997 | Allard et al. .............. 345/800 |
| 5,673,421 A | | 9/1997 | Shirakawa ................. 345/501 |
| 5,699,244 A | * | 12/1997 | Clark et al. ................ 702/2 |
| 5,754,176 A | * | 5/1998 | Crawford .................. 345/711 |
| 5,844,547 A | * | 12/1998 | Minakuchi et al. ........ 345/173 |
| 5,910,800 A | * | 6/1999 | Shields et al. ............. 345/711 |
| 5,966,135 A | | 10/1999 | Roy et al. .................. 345/619 |

(Continued)

OTHER PUBLICATIONS

Courter, Masering Microsoft Office 2000, 1999, Sybex, pp. 14-15.*

(Continued)

*Primary Examiner*—Phu K. Nguyen
(74) *Attorney, Agent, or Firm*—Gates & Cooper LLP

(57) ABSTRACT

An application on a personal digital assistant (PDA) displays a map. A graphical user interface permits the application to receive single gesture inputs of a stylus. If the single gesture input comprises a drag of the stylus a minimum distance, the map is panned such that the map is shifted to a new center view. The displayed map may contain one or more map objects. If the input comprises a single tap on a specific map object, the map object under the tap may be selected and highlighted. Further, a ToolTip for the map object may be displayed. A further tap of the ToolTip may result in the navigation to a link or URL associated with the map object selected. One or more zoom buttons may also be displayed. If a zoom button is tapped by the user, the map may be displayed in a different level of detail.

28 Claims, 11 Drawing Sheets

U.S. PATENT DOCUMENTS

| | | | |
|---|---|---|---|
| 5,973,678 A | 10/1999 | Stewart et al. | 345/184 |
| 5,974,431 A | 10/1999 | Iida | 715/515 |
| 6,057,854 A | 5/2000 | Davis, Jr. et al. | 345/619 |
| 6,321,158 B1* | 11/2001 | DeLorme et al. | 701/201 |
| 6,405,226 B1* | 6/2002 | Alpert et al. | 715/530 |

OTHER PUBLICATIONS

Courter, Masering Microsoft Office 2000, 1999, Sybex, pp. 14-15.*

Microsoft Paint, Version 4.0, Copyright 1981-1989 Microsoft Corp.*

ARGU95, Argus User's Guide 3.0, The Next Generation in GIS, Munro Garnett International, May 1994, pp. 176-180.

SOFT95, Specification for the Simple Vector Format (SVF) v1.1, article SoftSource, Bellingham, Washington, 1995, pp. 1-8.

XERO95, Map Viewer Technical Details, Xerox Corporation, Jun. 2, 1995, 3pp.

XERO95, Mapwriter (1) User Commands, Xerox Corporation Nov. 5, 1993, 4pp.

XERO95, About the Xerox PARC Map Viewer, Xerox Corporation, Jun. 1993, 1pp.

* cited by examiner

SINGLE GESTURE MAP NAVIGATION GRAPHICAL USER INTERFACE FOR A PERSONAL DIGITAL ASSISTANT

CROSS-REFERENCE TO RELATED APPLICATIONS

This application claims the benefit under 35 U.S.C. §119 (e) of the following co-pending and commonly assigned U.S. Provisional patent application, which applications are incorporated by reference herein:

U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al.;

U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al.;

U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al.; and U.S. application Ser. No. 60/193,862, entitled "MAPGUIDE FOR MOBILE DEVICES SERVER," filed on Mar. 30, 2000, by Nemmara Chithambaram, et. al.

This application claims the benefit under 35 U.S.C. §120 and 35 U.S.C. §363 of the following co-pending and commonly assigned international patent application number PCT/US00/26436, entitled "GEOGRAPHIC MAPS ON A PERSONAL DIGITAL ASSISTANT (PDA) AND SERVER, filed on Sep. 26, 2000, by Autodesk, Inc., which application claims the benefit under 35 U.S.C. §119(e) of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA) MAPS," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.; and which international application is a continuation in part of U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram et al., filed on Jul. 31, 2000, U.S. patent application Ser. No. 09/628,851, entitled "GEOGRAPHICAL DATA MARKUP ON A PERSONAL DIGITAL ASSISTANT (PDA)", by Edward J. Connor, et al., filed on Jul. 31, 2000, U.S. patent application Ser. No. 09/628,850, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on Jul. 31, 2000, and U.S. patent application Ser. No. 09/629,117, entitled "METHOD AND APPARATUS FOR OBTAINING A SET OF MAPS", by Howard Marantz et al., filed on Jul. 31, 2000.

This application is a continuation-in-part of the following co-pending and commonly assigned United States patent applications, which are incorporated by reference herein:

U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram et al., filed on Jul. 31, 2000 which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.;

U.S. patent application Ser. No. 09/628,850, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on Jul. 31, 2000, which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.;

U.S. patent application Ser. No. 09/628,851, entitled "GEOGRAPHICAL DATA MARKUP ON A PERSONAL DIGITAL ASSISTANT (PDA)", by Edward J. Connor, et al., filed on Jul. 31, 2000 which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.; and U.S. patent application Ser. No. 09/629,117, entitled "METHOD AND APPARATUS FOR OBTAINING A SET OF MAPS", by Nemmara Chithambaram et al., which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.

This application is related to the following co-pending and commonly-assigned patent applications, which applications are incorporated by reference herein:

U.S. patent application Ser. No. 09/411,506, entitled "VECTOR-BASED GEOGRAPHIC DATA", by Gregory A. Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA"; and U.S. application Ser. No. 09/795,719, entitled "INTERPROCESS APPLICATION PROGRAMMING INTERFACE FOR PERSONAL DIGITAL ASSISTANT APPLICATIONS," filed on the same date herewith, by Timothy John Nelson, et. al.

BACKGROUND OF THE INVENTION

1. Field of the Invention

The present invention relates generally to electronic maps and geographic information, and in particular, to a method, apparatus, and article of manufacture for navigating a map displayed on a personal digital assistant (PDA).

2. Description of the Related Art

Computer implemented geographic information systems (GIS) are known in the art. Such GIS provide for the retrieval and display of geographic information (e.g., maps). A GIS is a system of software, hardware, and data that delivers geographic data (street maps, property boundaries, power transmission lines, etc.) along with any associated attribute information. It can show you where a street is and also tell you the street name, when it was last paved, whether it is a one-way street, etc. Using a GIS, a user can perform complex queries (from a web browser to a server) to discover such things as how many people live near the street, what their income level is, and what the zoning laws are. A GIS can operate on a network/internet wherein the geographic information is stored on a server and transmitted to a client/user where the information (map picture and other data) is displayed on a web browser.

For the client to properly display the geographic information, a computer system with the appropriate processing capabilities, software, and memory is required. For example, a client may be required to utilize a computer with a web browser such as INTERNET EXPLORER or NETSCAPE NAVIGATOR and have a minimum of 10 megabytes of available memory. Additionally, to display the geographic data such that a user does not have to wait an inordinate amount of time to retrieve and load the data, an appropriate Internet connection (e.g., a 28.8 Kbps (kilo bits per second) modem) and a computer system with significant processing power (e.g., a minimum speed of 100 megahertz) may be required.

Field/utility technicians such as gas company employees, salespersons, plumbers, insurance adjusters, or any type of employment that requires travel to different locations, often utilize or require access to maps and geographic information. Further, such technicians often need to interact with a map to obtain relevant information. For example, a plumber/contractor may want to determine where the main gas line or water line on a street is located. However, while out in the field, the technicians often do not have a network connection, and carrying a laptop or desktop computer is cumbersome and impractical. Thus, it is desirable to have a small (handheld) portable computing device with the capabilities to display and interact with geographic information both online and offline.

Prior art handheld computing devices (also referred to as palm PCs or personal digital assistants (PDAs)), are often used to access and utilize personal information. Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g., a modem). Additionally, some PDAs have infrared (IR) ports for communication.

Field technicians using a PDA need to view, interact, and navigate maps displayed. The PDA environment, however, poses several challenges for geographic information systems in terms of map navigation, memory, storage, processor speeds, wireless transmission rates, and display attributes. For example, the screen area of PDAs is typically small (160×160 pixels) and PDAs commonly only maintain 96K or less of memory, 2 Mb (megabytes) or less storage, a 13 MHz processor speed, and a black and white or gray scale display mechanism. Additionally, a stylus takes the place of a multi-button mouse. Map navigation may be particularly difficult on a PDA since technicians in many instances work in trenches or other places where a user's range of motion and vision are significantly limited.

Thus, there is a need for a geographic information system that overcomes the above described deficiencies on a portable handheld electronic device such as a PDA.

SUMMARY OF THE INVENTION

One or more embodiments of the invention provide for an interactive geographic information system on a personal digital assistant (PDA). The system enables the viewing, interaction, and navigation of maps on a PDA.

A graphical user interface (GUI) on the PDA displays a map requested by a user. A user may navigate the displayed map using movements of a stylus. When a single gesture input is received from a stylus, various functions and/or actions may be invoked. When a user drags a stylus more than a minimum distance, the system interprets the dragging as an attempt to pan the displayed map. Accordingly, the map is panned based on the stylus drag.

If the stylus was not dragged a minimum distance, it indicates that the user has tapped the map with a possible attempt to select a map object or button. If a zoom button was selected, the single tap gesture results in either zooming out or in on the map depending on the button selected.

If the user has tapped and selected a map object, a ToolTip associated with the map object may be displayed. The ToolTip may contain text or a link to a URL or file associated with the selected map object. If the ToolTip contains a URL or link, the text displayed in the ToolTip may be underlined or differentiated from standard text to indicate further action is possible.

Once a ToolTip containing a link has been displayed, the application may wait for further action from the user. Further, if the user taps the link or ToolTip containing the link, the application may navigate the user to the link associated with the ToolTip, if any. Such navigation may comprise invoking another application (e.g., a web browser application).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for a graphical user interface for navigating maps on a personal digital assistant (PDA). In the graphical user interface, a single gesture by a user using a stylus may result in a continuous pan, a zoom in or out of a map, a selection of a single object on the map, or the viewing of a report associated with a selected map object.

Embodiments further provide the use of the MAPGUIDE geographical information system (available from the assignee of the present invention) on a PDA. Software on the PDA is enabled to provide such functionality. Further, a servlet that provides enhanced server functionality may interface between the web server and the PDA to accommodate any additional processing needed.

Raster maps provide multiple zoom levels with each zoom level comprising multiple tiles that allow for "virtual roaming" across a map. Further, selectable vector geometry (for interacting and highlighting with user objects), geo-referencing information for map navigation, meta-data in the form of layer definitions (visibility, display attributes, etc.), links to object attributes in databases, links to object reports generated by corporate web servers, uploadable, sharable redlining data (created from scribbles on the field), and access to geographical information both online and offline on the PDA are provided. Accordingly, users will maintain the ability to access maps and other geographical information while offline and not connected to a network or server.

General Architecture

Hardware Environment

The use, on a PDA, of a modified MAPGUIDE GIS currently available from the assignee of the present invention is provided. The existing MAPGUIDE GIS is more fully described in co-pending U.S. patent application Ser. No. 09/411,506, entitled "VECTOR-BASED GEOGRAPHIC DATA", by Gregory Andrew Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA".

Figure 1:
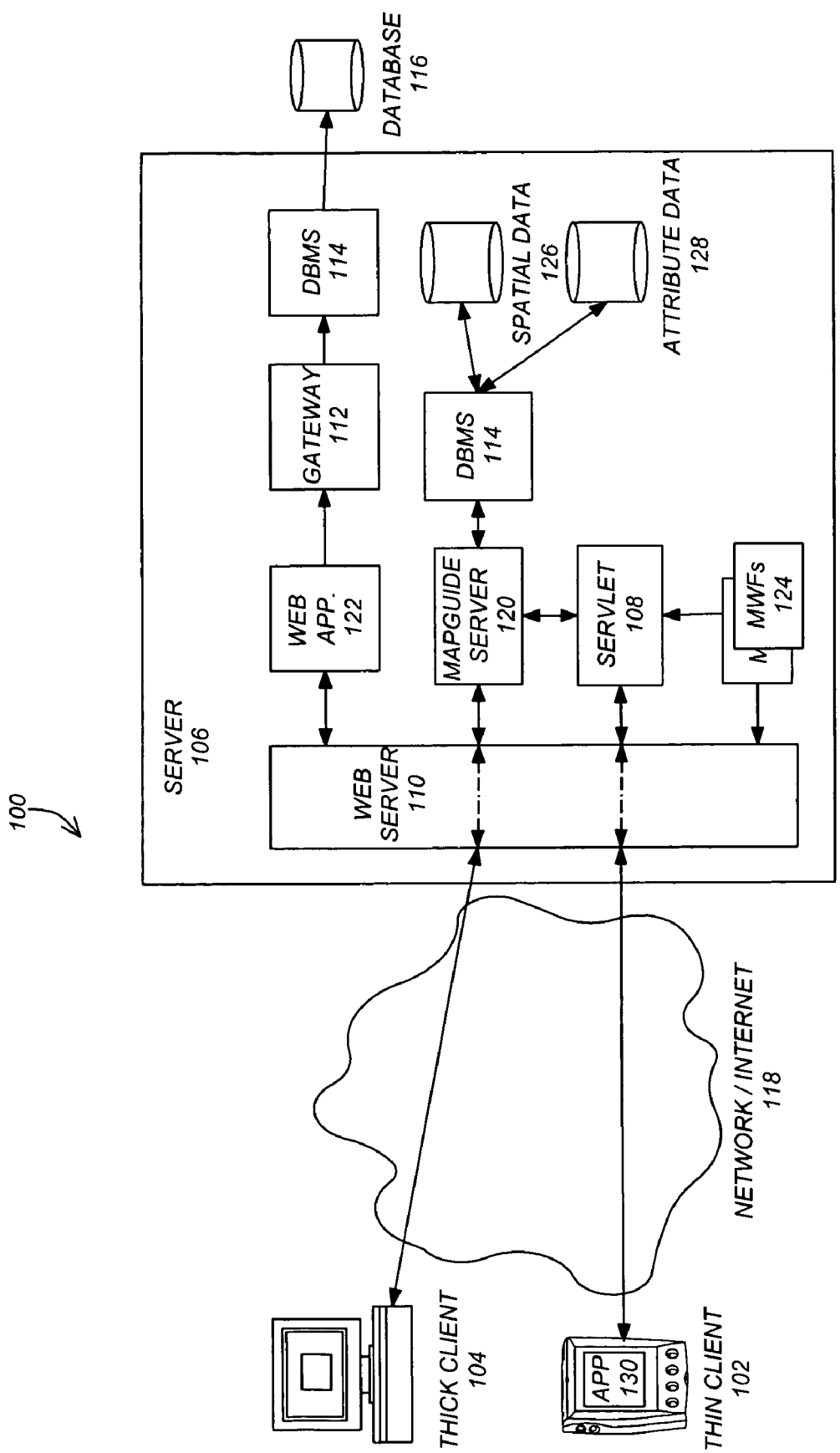
FIG. 1 schematically illustrates a hardware and software environment for the architecture in accordance with one or more embodiments of the invention.

FIG. 1 schematically illustrates a hardware and software environment for the architecture in accordance with one or more embodiments of the invention. A typical distributed computer system 100 uses a network/Internet 118 to connect technicians utilizing clients such as a thin client 102 (e.g. a PDA, WINCE, or PALM device) or a thick client 104 (e.g., a computer system running a browser) to server computers 106.

A thick client 104 as utilized in the existing MAPGUIDE GIS may comprise a computer with a web browser (enhanced with a plugin or viewer) connected to a web server 110 that communicates with a MapGuide server 120 to retrieve data (e.g., raster data, spatial data format (SDF) data 126, attribute data 128, etc.).

A thin client includes three classes of devices: handheld personal computers (HPC), palm-held personal computers (PPC or PDA), and smart phones. Using these devices, a thin client 102 may not provide the full processing and memory capabilities as a thick client 104. For example, as described above with respect to PDAs, thin clients 102 often have memory less than 100K, storage of less than 2–4 MB, processor speeds of 13 MHz, and limited display attributes. Consequently, additional server 106 side support (e.g., more generalized display data, simplified project files, de-cluttering services, and possibly server management of user state) may be utilized. A typical combination of resources may include a network/Internet 118 comprising the Internet, LANs, WANs, SNA networks, or the like, clients 102 and 104 that are PDAs, personal computers or workstations, and servers 106 that are personal computers, workstations, minicomputers, or mainframes.

The network/Internet 118 connects client computers 102 and 104 executing the appropriate software applications 130 to server computers 106 executing Web servers 110, MapGuide servers 120, and servlets 108. MagGuide servers 120 and servlets 108 may be located within or part of web server 110. The server 106 and its components may also be referred to as a back office system. Such a back office system maintains access to corporate databases, synchronization utilities, etc. The Web server 110 is typically a program such as an Apache Web Server or Microsoft's Internet Information Server. The servlet 108 communicates with thin client 102 through web server 110 such that any additional processing required by a thin client 102 may be performed by the servlet 108. Servlet 108 communicates with MapGuide server 120 to obtain needed map data/information. Additionally, servlet 108 accesses map windows files (MWF) 124 to obtain relevant data. The servers 106 may also execute a Common Gateway Interface (CGI) 112 (or Netscape Application Programming Interface (NSAPI), Internet Server Application Programming Interface (ISAPI), etc.), which interfaces between the Web server 110 and a database management system (DBMS) 114 that may be utilized to retrieve relevant geographical data (such as SDF data, raster data, Open DataBase Connectivity (ODBC) data, etc.) from database 116.

Generally, components 108–116 and 120–130 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Software Embodiments

In accordance with the hardware descriptions, thick clients 104 are complete computer systems with web browsers and full processing capabilities. However, the hardware limitations of a PDA device necessitate software limitations. Accordingly, to enable a geographic information system on a PDA, a thin client 102 executing an application 130 is provided. To accommodate the thin client, additional support on server 106 may be utilized. For example, server 106 may provide more generalized display data, simplified project files, de-cluttering services, and possibly server management of the user state.

The architecture of the invention includes a data model that combines static raster layers (static raster data fort multiple layers) with live vector objects to deliver good display and download performance, and also provides interactive selectable objects.

Vector based maps (also referred to as "map layer data" consisting of geographic information/data for one or more layers) are served by a servlet 108 and are an encoded and spatially indexed vector representation of the geographic data. Such vector maps provide for a more "interactive" display with flexible zooming on the client 102, highlighting, etc. Alternatively, the Scalable Vector Graphics (SVG) representation as proposed by the WorldWideWeb Consortium (W3C) may be utilized. SVG allows for three types of graphic objects: vector graphic shapes (e.g., paths consisting of straight lines and curves), images, and text. Graphical objects can be grouped, styled, transformed, and composited into previously rendered objects.

A display background (that is raster based) for the geographic data and display layers is managed as a multilevel library of raster tiles. The raster layers are composed from multiple vector layers on servlet 108, resulting in better download and display performance. The raster map on the PDA allows panning (virtual roaming paradigm), and zooming across multiple levels. A smart-cache on thin client 102 allows the swapping of compact tiles from the database to memory, in a manner appropriate to the device. A single workspace per map provides the definition of the map and the display attributes for the layers on the thin client 102.

PDA users (e.g., technicians) can make scribbles and annotations on the map using a paper and pencil metaphor. To accommodate such markup, embodiments provide a markup object that consists of geometric scribbles (points, lines, polygons, symbols), GPS (global positioning system) input coordinates, annotations (positioned text with font information, etc.), and a geo-reference system that allows the markup object to be integrated into a spatial database 116 using server 106 and displayed on other maps. The markup system captures user input and allows for markup objects to be uploaded to server 106. Further, the level of sharing on the server 106 side is configurable (e.g., personal, group, global, etc.).

Details of Architecture

Thin Client 102

The user of a thin client 102 such as a PDA displays geographical information (e.g., maps) using application 130. The architecture of the invention accommodates various thin clients 102 such as Palm OS devices, WINDOWS CE 2.x devices, and/or smart phones with bitmapped graphics (e.g., SYMBIAN, MOTOROLA, NOKIA, PSION). The startup time for the GIS on the PDA is comparable to other applications on the PDA. Further, the thin client 102 (and application 130) is enabled to store non-spatial data gathered from within the GIS application in a format suitable for uploading to or synchronizing with major relational database management system (RDBMS) vendors.

Thin client 102 supports a variety of net access patterns. For example, thin client 102 can have a connection to the back office system (e.g., server 106) periodically (e.g., at the beginning and/or the end of the day), on-demand (e.g., through a wireless modem), or continuously.

Figure 2A:
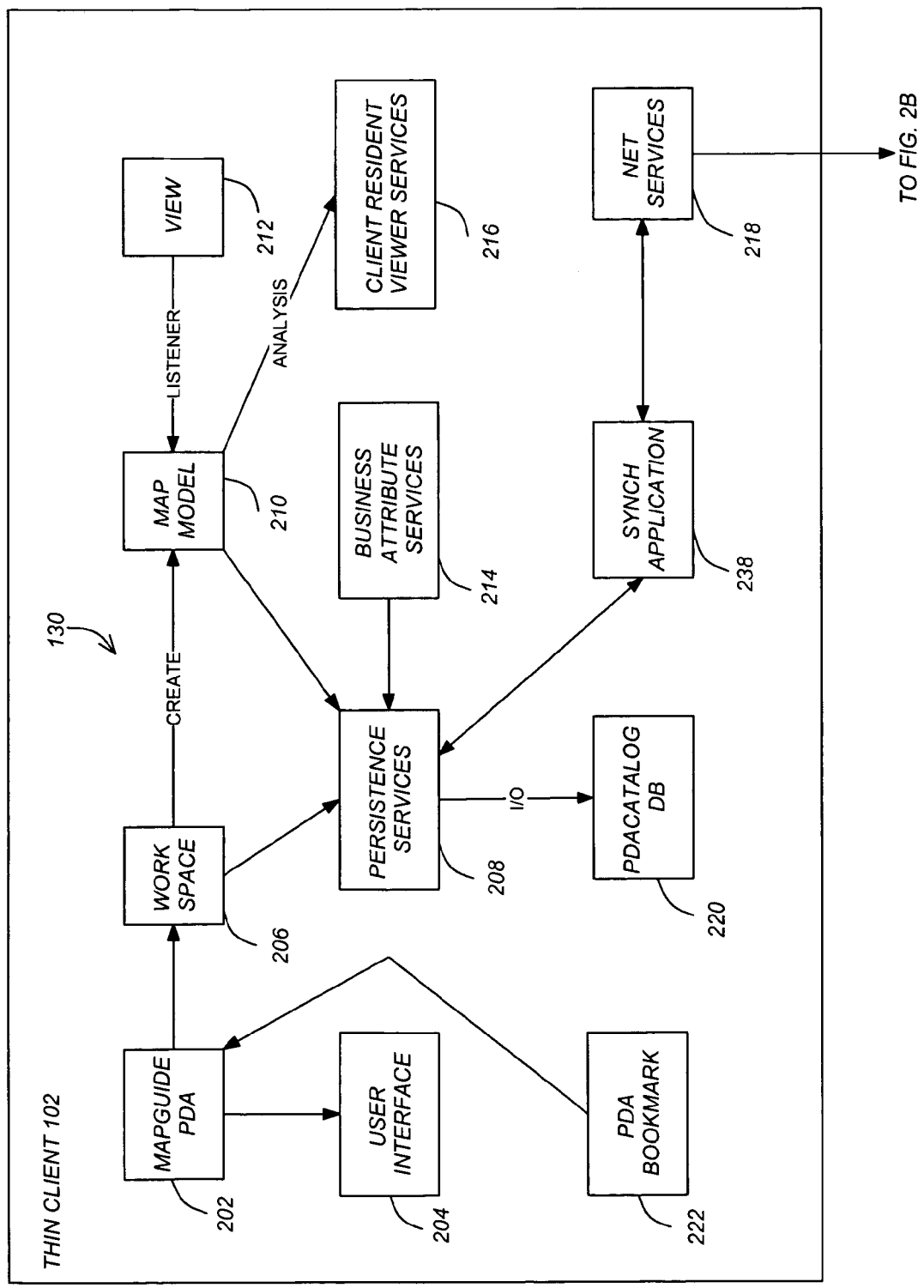
FIGS. 2A and 2B illustrate the interaction between a thin client, a servlet, and additional components in accordance with one or more embodiments of the invention.
Figure 2B:
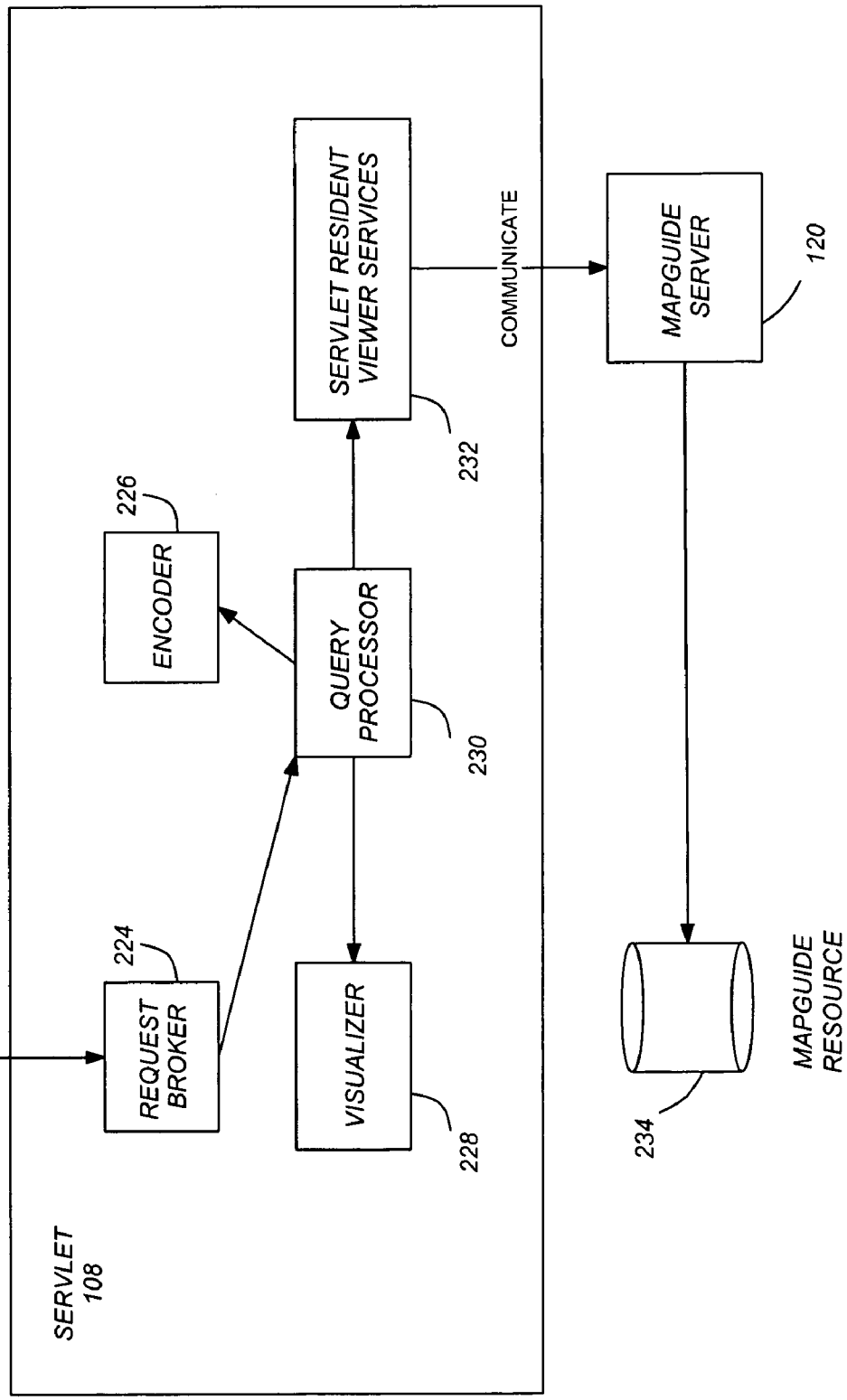

FIGS. 2A and 2B illustrate the interaction between thin client 102, servlet 108, and additional components. Thin client 102 is made up application 130 that comprises subcomponents that allow viewing, navigation, and querying of a map model on the PDA. Thin client 102 and application 130 also includes services that allow management of business attributes 128, communication with servlet 108, and persistence management. Accordingly, application 130 collectively refers to the subcomponents on thin client 102 (i.e., subcomponents 202–222 and 238).

To initialize the PDA thin client 102 with the appropriate map data, a user starts up the synchronization application 238. Synchronization application 238 is the application on the PDA thin client 102 responsible for synchronizing information and map data stored in a database 220 on PDA thin client 102 with the relevant map data. Synchronization application 238 utilizes net services 218 to communicate with servlet 108 (through web server 110) and to obtain the relevant map data. Net services component 218 provides services for two way communication (and exchange of data) with servlet 108 (i.e., following the link to FIG. 2B). Accordingly, synchronization application 238 may communicate with servlet 108 to obtain the location of the map data. Thereafter, synchronization application 238 retrieves/obtains the map data from the identified location.

Upon receipt of the map data in the synchronization application 238, persistent services 208 is utilized store the data (by performing various I/O operations) in PDA catalog database 220. Thereafter, the synchronization process is complete. Such synchronization can be performed as often as desired depending on the configuration of the PDA thin client 102. For example, if thin client 102 has a wireless modem, the synchronization operation can be performed whenever desired. If however, a direct connection is required, synchronization can only occur when the thin client 102 is connected to network 118 (or to server 106).

The MapGuide PDA component 202 is the main application that provides the user interface (UI) 204 and responds to events. The user interface component 204 is the placeholder for the user interface controls that are specialized for the PDA. Accordingly, once the relevant map data has been retrieved using synchronization application 238, the MapGuide PDA application 202 may be initialized/started by the user. Details of the UI and map navigation are described below.

MapGuide PDA component 202 requests the persistence services component 208 to load the active workspace 206. The active workspace 206 provides/creates the definition of the map model 210. Thus, the active workspace 206 may be seen as a minimized version of the traditional map file (referred to as a map window file (MWF)) for the PDA 102. The map model 210 provides the services related to maintaining and manipulating map layers and map objects.

The persistent services component 208 loads the workspace 206 by providing object based database management services (ODBMS) using the local PDA database (PDA CatalogDB 220). The PDA catalogDB 220 is the local database of geographic information that is resident on the PDA. Thus, the PDA catalogDB encapsulates the local PDA catalog database and provides the application programming interface (API) for record manipulation.

View component 212 listens to changes in the map model 210 and updates the map display when necessary. The business attributes services/manager component 214 provides services related to managing non-spatial business attributes.

Client resident viewer services 216 interact with map model component 210. The client resident viewer services component 216 provides a flexible architecture that allows viewer service components to reside on either the client 102 or the servlet 108. These services may be represented by two components: the client resident viewer services component 216 of FIG. 2A and the servlet resident viewer services component 232 of FIG. 2B. The services performed by client resident viewer services 216 and servlet resident viewer services 232 may be combined and reside entirely on client 102 or server 106. All client 102 components send requests for viewer services to the client resident viewer services 216. The client resident viewer services component 216 will perform the service if the required components are locally available on the client 102. If not, the request may be delegated to the servlet resident viewer services 232 through synchronization application 238. For example, for a given client configuration, polyline drawing services may be available on client 102, whereas buffering services may be available on servlet 108.

Figure 3:
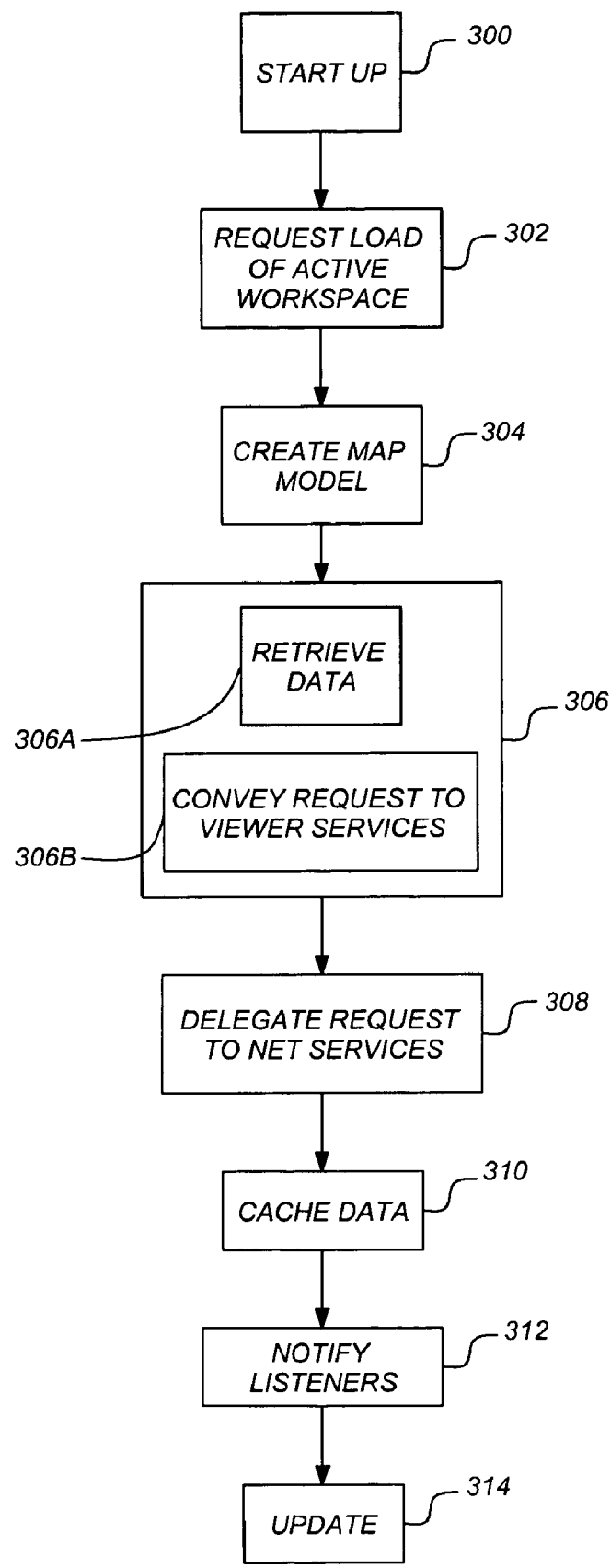
FIG. 3 is a flow chart illustrating the display of a map upon starting up a mapguide application on the PDA in accordance with one or more embodiments of the invention.

FIG. 3 is a flow chart illustrating the display of a map upon starting up an application 130 such as mapguide application 202 on the PDA in accordance with one or more embodiments of the invention. At step 300, the mapguide PDA 202 is asked to start up. At step 302, the mapguide PDA 202 requests the persistent services 208 to load the active workspace 206 (from the local PDA database 220). At step 304, the workspace 206 uses map definitions to create a new map model 210. The map model 210 populates layers in the model at step 306. The populating of step 306 may be performed by using the persistent services 208 to get data from the local PDA database 220 at step 306A and/or conveying the request to client resident viewer services 216 at step 306B. If client resident viewer services 216 determines that the service requires servlet resident viewer services 232, the client resident viewer services 216 delegates the request to net services 218 through synchronization application 238 at step 308.

At step 310, any downloaded data may be optionally cached in the local database 220 using persistent services 208. The model 210 notifies listeners (including the view 212) of the change at step 312. View 212 updates itself by getting display attributes from the workspace 206 and updating the map display at step 314.

After viewing the map, a user on thin client 102 may markup or redline the map (i.e., the map and attribute data) as desired using a stylus. Markup data comprises pixel data for a markup entity. Application 130 provides the ability to obtain markup data from the user through user interface 204. Application 130 then creates a file comprised of the markup data and provides for uploading the file from thin client 102 to server 106. The file is uploaded to the server 106 by obtaining a socket connection, obtaining an inventory of resident mapsets, searching for markup data associated with the resident mapsets on thin client 102, and uploading all resident markup data to the server 106.

As described above, the markup entity may comprise a markup object that provides various mechanisms for marking up a map. For example, the user may draw a redline line wherein the markup object is a redline object. To draw a redline line, the application 130 determines when a new redline object has been selected and captures the stylus movements in a redline object while the stylus remains in contact with the screen of thin client 102.

In another example, the markup data is a note, and the application 130 is configured to obtain the markup data in a note object. To insert/draw a note, application 130 determines when a new note object has been selected, accepts a user selection of an anchor point in a display of a map on the thin client 102, displays a text entry screen 204 on the thin client 102, accepts text user input in the text entry screen 204, and displays an icon representative of the note at the anchor point.

To accommodate the markup data on server 106, server 106 is configured to obtain a file comprised of markup data for the map and attribute 128 data, convert the markup data to coordinate data, and use the coordinate data to obtain a standard data format (SDF) file that can be used to superimpose the markup data on the map and attribute 128 data. Any component on server 106, including servlet 108, may provide such functionality.

Map Navigation Graphical User Interface (GUI)

In addition to redline functionality, one or more embodiments of the invention provide a GUI for navigating a map. Map navigation may be accomplished using a variety of single gestures such as selecting a menu, tapping, and/or dragging with the stylus.

A map screen may include one or more of the following elements: a map; a menu; and Zoom In and Zoom Out navigation buttons on a title bar. Various navigation buttons may be provided on a map display screen including Zoom In and Zoom Out. The Zoom In and Zoom Out buttons may function in the same way as Zoom In and Zoom Out menu items. If the menu is dropped down (visible), the buttons may not be available as they may be covered up by the menu. The buttons may also not be available during a Redline operation, as all (or a portion of) menu items except Finish Redline may be disabled during a Redline operation.

Figure 4:
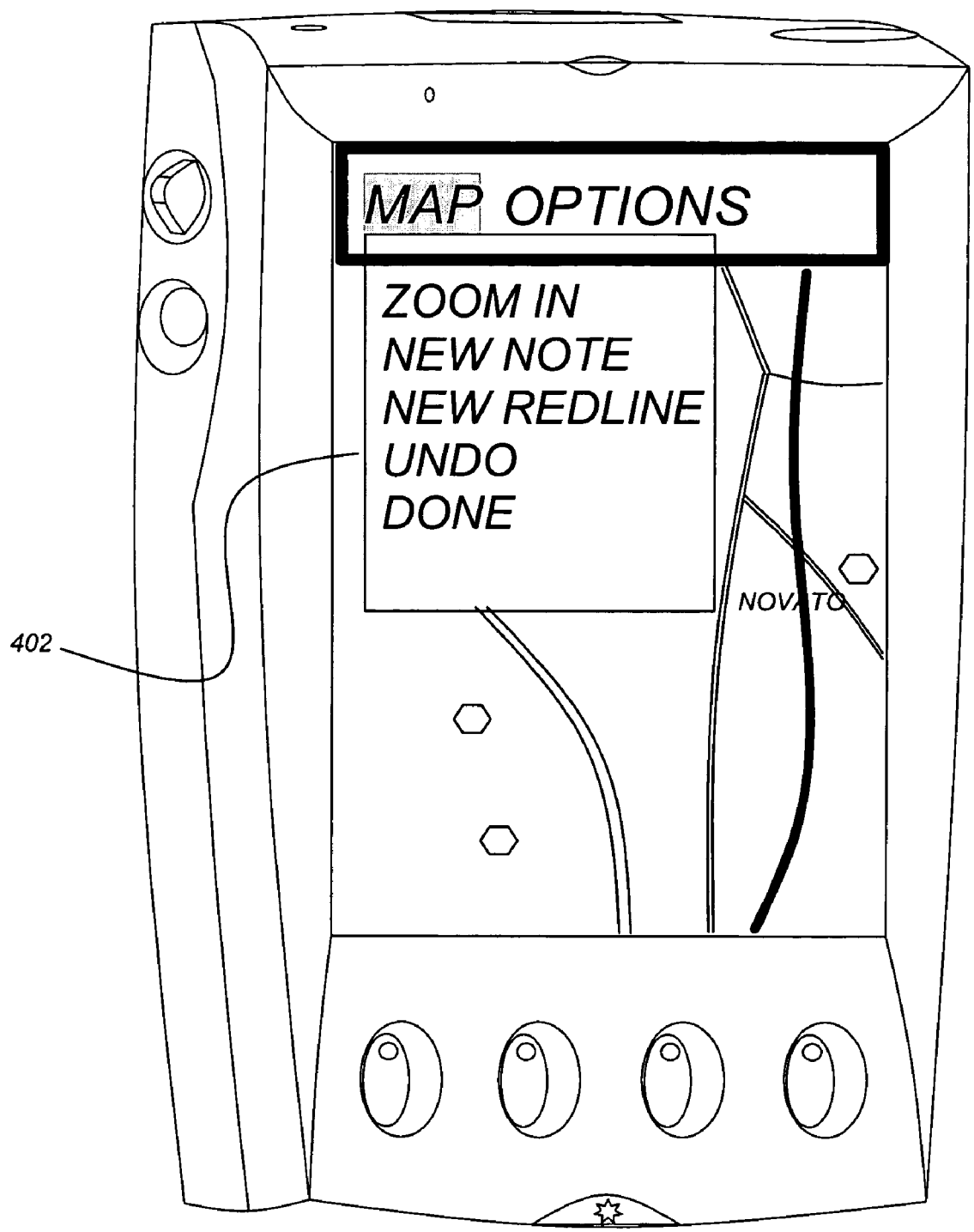
FIG. 4 illustrates the menus available to the user when a user taps a Menus icon on a PDA when on a map screen in accordance with one or more embodiments of the invention.

FIG. 4 illustrates the menus available to the user when a user taps a Menus icon on a PDA when on a map screen. Note that in FIG. 4, the left-most menu choices 402 (i.e., Zoom In, New Note, New Redline, Undo, and Done) in "Map" are already visible (dropped-down). The graphical user interface (GUI) may also enable menu shortcuts wherein a display that indicates a command stroke plus a letter may indicate that a user can use the graffiti symbol plus a letter as a shortcut for choosing a menu item.

Panning

The GUI enables a user to pan a map across the PDA's display screen. To pan, the user holds down the stylus and drags the stylus to the desired new view. A minimum distance of movement before a pan operation begins may be required. By requiring a minimum distance, the drag operation may be distinguished from a selection/tap operation (e.g., a press/release without moving more than the threshold distance). In a drag operation, the map may be constrained from panning beyond the halfway mark of the view area. In other words, the user may not be allowed to pan the edge of any map beyond the center of the view. In such an embodiment the center point of the PDA screen may always be required to fall inside of the map.

The GUI may also provide a means by which the user can return (pan) to a designated target point. In such an embodiment, the zoom factor may not be affected.

Zooming

A user may be presented with the option of zooming in closer or zooming away from a currently displayed map. Depending on the availability of zooming in or out from the current level of detail, a zoom in or zoom out button may be displayed on the PDA screen.

For example, an overview map may currently be displayed. If a more detailed view of the overview map is available, the "Zoom In" item may appear in the menu and a "Zoom In" button may be displayed on the screen. Further, if a less detailed view of the overview map is available, a "Zoom Out" item may appear in the menu and a "Zoom Out" button may be displayed on the screen. Both the Zoom Out and Zoom In items may be displayed simultaneously. To zoom in or zoom out, the user may select "Zoom In" or "Zoom Out" from the Map menu or may use a single tap gesture on either the Zoom In or Zoom Out button.

Once the user elects to zoom in or out, the map view immediately zooms/navigates to the requested map level/level of detail, while maintaining the existing view center. A mapset consists of an array of maps (up to 9 zoom levels, not including the initial map). The Zoom In menu choice and button will be displayed if there is a more detailed view available and removed from the menu otherwise. Similarly, the Zoom Out menu choice and button will be displayed if there is a less detailed view available and removed otherwise. All of the zooms implicitly reference the MWF of the initial map. The user doesn't zoom between different MWF files, only between scales and centers within an MWF file.

Figure 5:
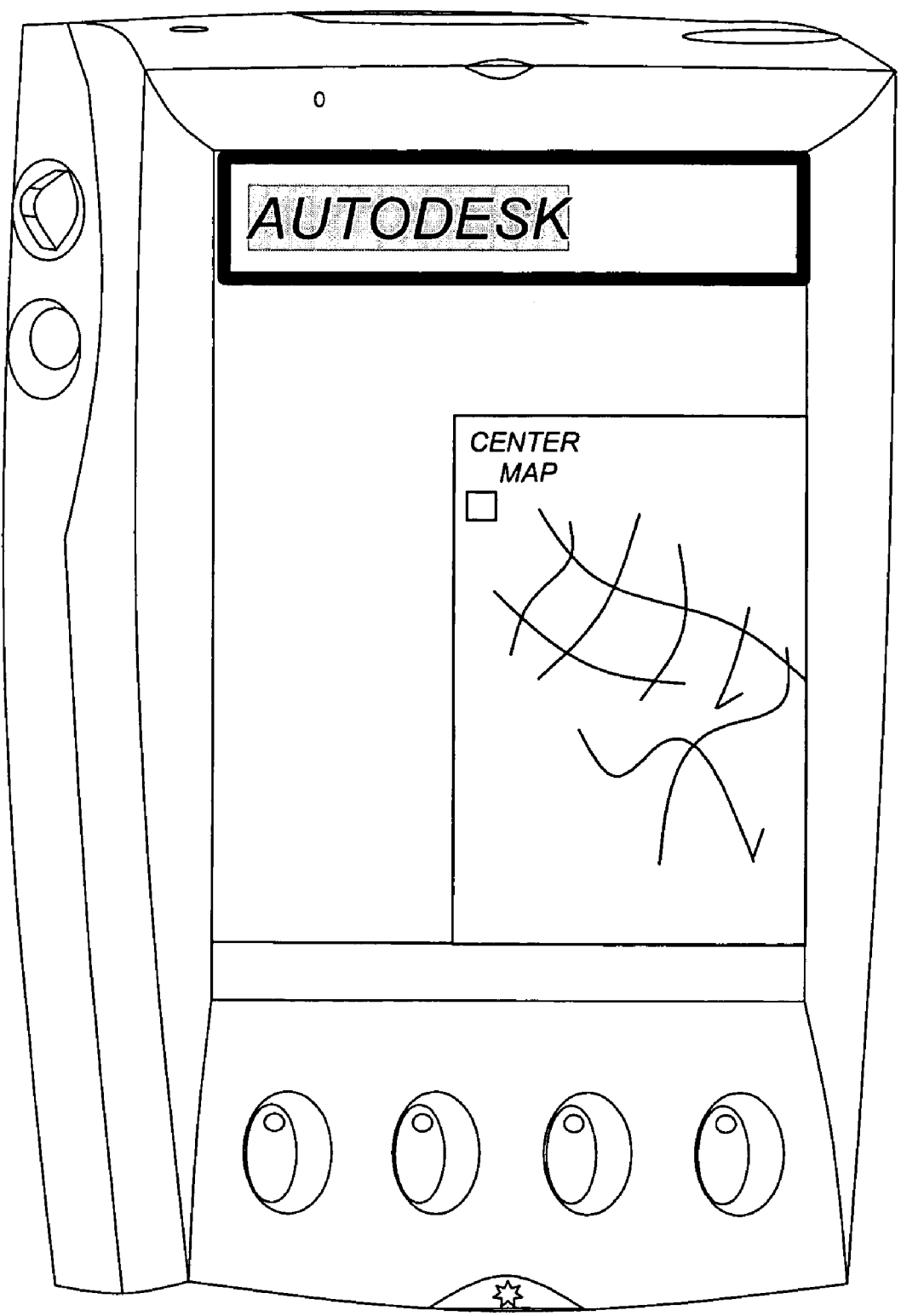
FIG. 5 illustrates an example of a level of detail displayed on a PDA wherein the edge of the map extends just beyond the center of the view in accordance with one or more embodiments of the invention.

A user may not be allowed to zoom in if a more detailed map does not cover the geographical point corresponding to the center of the view. FIG. 5 illustrates an example of a level of detail displayed on a PDA wherein the edge of the map extends just beyond the center of the view. Additionally, in FIG. 5, a more detailed map of the area in the center of the view is not available. Accordingly, the user is not presented with the option of zooming in.

The GUI may also provide the ability to support a single level for a raster zoom. (pixel replication). For example, the GUI may provide a magnifying glass icon, on both an overview and detail level map, to enable viewers to look at the same map in a larger view. Such an icon may be activated using a single gesture such as a tap of the stylus on the magnifying glass or the area that the user desires to magnify. A similar icon with similar functionality may be used to zoom out or display a less detailed view of a map.

Map Object Display and Selection

As described above, a map may comprise one or more map objects. A map object may have numerous non-graphical attributes. For example, a map object may have an object type, a key value (for linking to database records), a simple text attribute (e.g., a road name for display in a ToolTip as discussed below), or a URL to a web page (e.g., maintenance information for the selected object) or to another map, drawing or image (e.g., detailed schematic diagram).

In the GUI, map objects and their attributes (graphical and non-graphical) may provide various functions when selected by a user. For example, the selection of a map object may link a user to the URL specified in the URL attribute. The selection of a map object may also permit the display of a ToolTip that contains the text from the simple text attribute.

When one or more map objects are selected, the GUI may highlight the selected objects using a ToolTip icon. Such functionality combines selection representation with that of ToolTips. The text within a ToolTip may comprise the value of the key attribute, the simple text attribute, or the URL attribute for the selected object. Where a link (e.g., a link to a file or a URL) is present, the ToolTip text may be displayed and underlined. This underlined text may effectively act as a button. If the object has an URL but no ToolTip text, the string "More Info . . . " may be displayed.

The user may navigate to the file or URL identified by the link via the ToolTip. To navigate, the user may merely tap on the ToolTip with the stylus and be transported to the URL or file. Depending on the value of the link, the appropriate application may be invoked/initialized. For example, if the link is to a mapset, the mapset may be opened in a GIS application. However, if the link is to a URL, an AvantGo application may be initialized.

To indicate that a selection has been made (e.g., that a user's tap is being processed), when the user taps on the ToolTip, the ToolTip text may change to reverse video while the link is loading.

A ToolTip may not be displayed if there is no text or URL associated with the object. Additionally, an audible click may sound when the user taps a selectable object, menu item, or ToolTip with a link. An audible error tone may sound if the user taps an area where there is no selectable data or if the user taps a tool tip that has no link associated with it.

ToolTips may behave differently depending on various factors such as where the selected object is located on the map. For example, a ToolTip may be displayed near, but not on, a point on the selected object closest to the pick point. The selected object may flash (blink on and off) as a highlighting mechanism. The ToolTip may also expand to cover the selected object wherein the blinking object may be visible through the ToolTip text. Additionally, the text within a ToolTip may wrap to keep the ToolTip within the size of the screen. The PDA application may restrict the ToolTip to a maximum width that is roughly 80% of the screen width.

The text string in a ToolTip may have a maximum length. When the maximum length has been reached or exceeded, the text may be truncated. For example, the text may be truncated with ellipsis when the text length causes the height of the ToolTip to reach fifty percent (50%) of the screen height.

Figure 6:
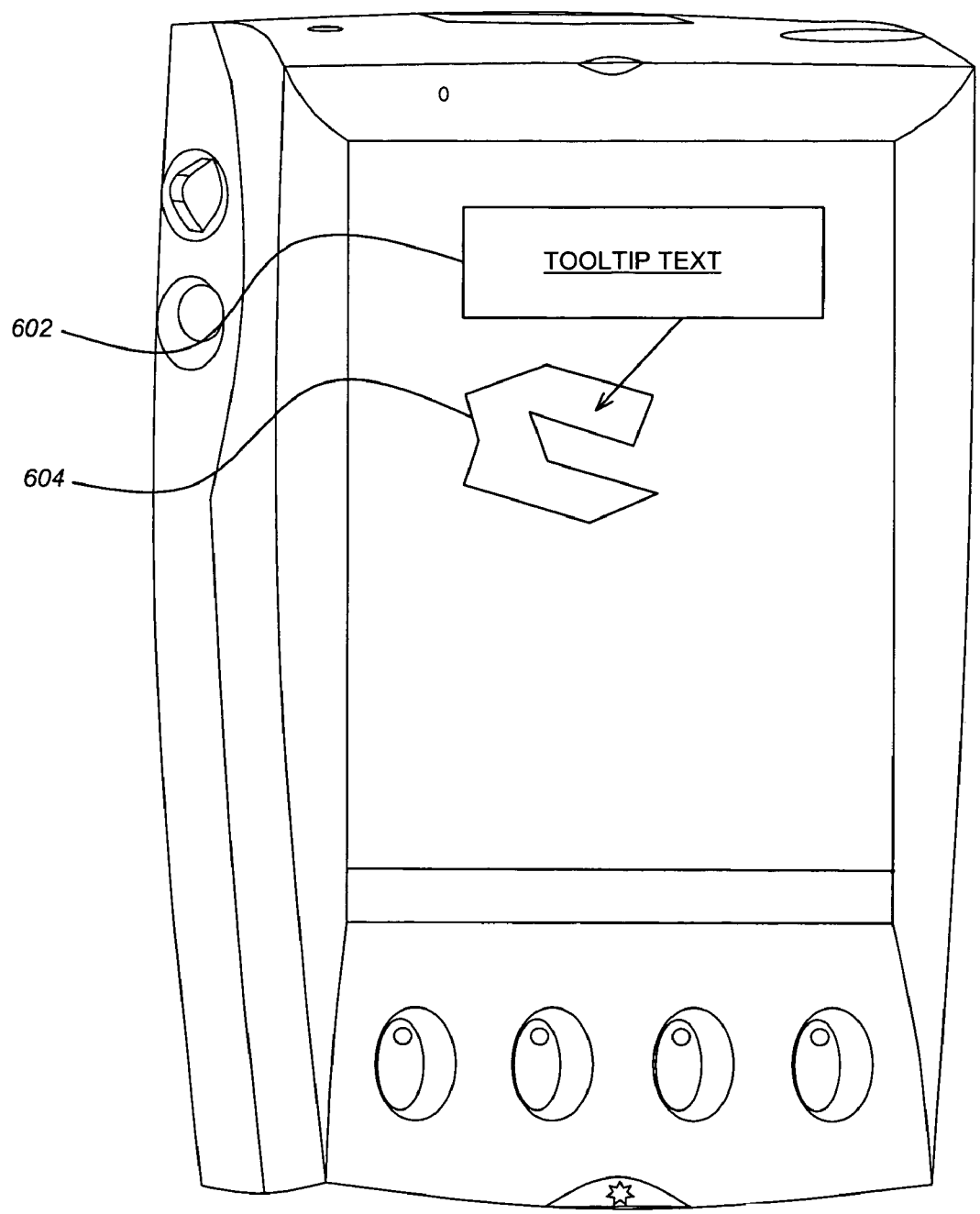
FIG. 6 illustrates a visual representation of a ToolTip in accordance with one or more embodiments of the invention.
Figure 7:
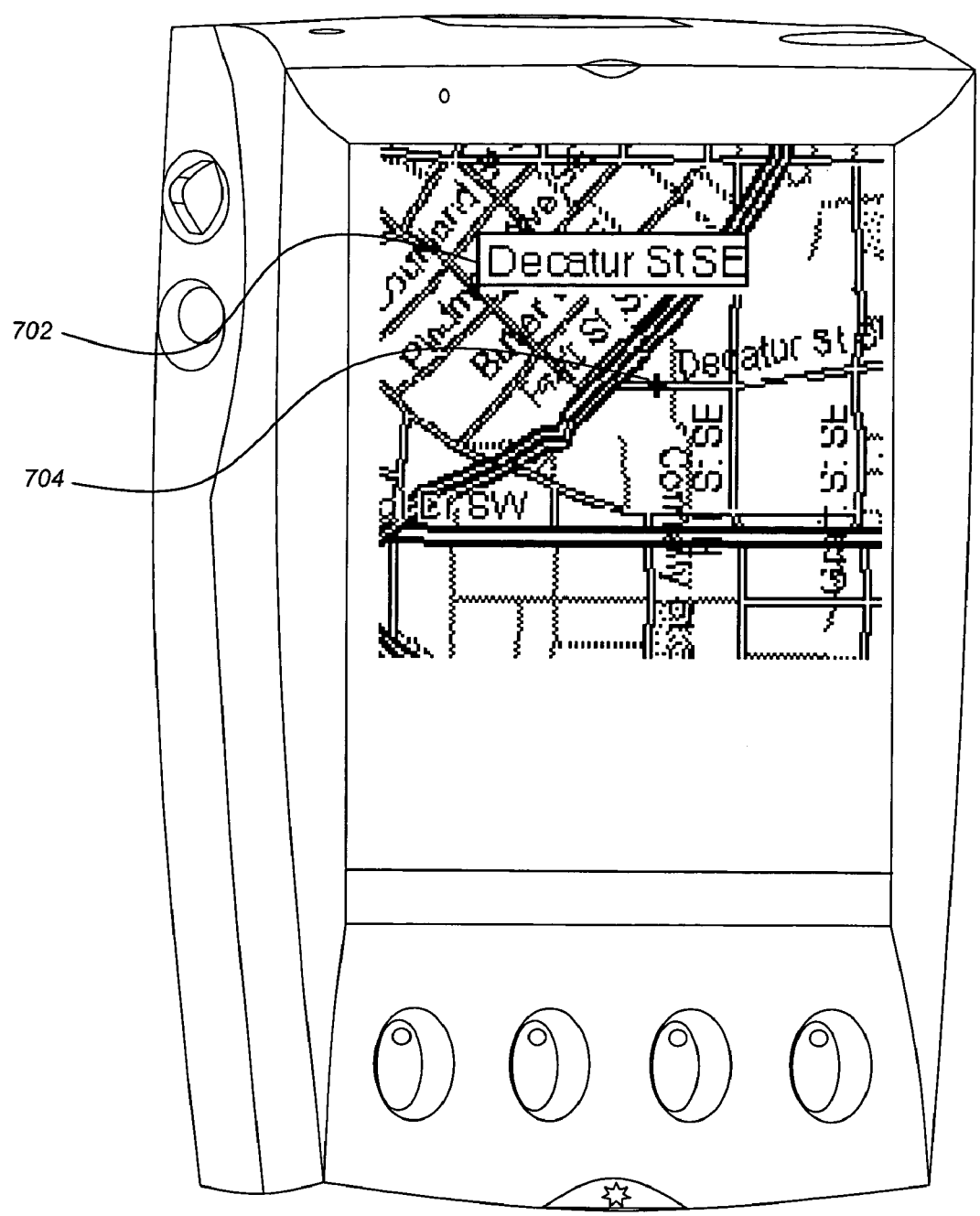
FIG. 7 illustrates an actual ToolTip and map in accordance with one or more embodiments of the invention.

FIG. 6 illustrates a visual representation of a ToolTip in accordance with one or more embodiments of the invention. In FIG. 6, the ToolTip 602 is displayed in proximity to the selected object 604. FIG. 7 illustrates an actual ToolTip 702 and map 704. The map of FIG. 7 is a bitmap of downtown Atlanta. The selected object 704 is Decatur St SE (as indicated by the ToolTip 702).

Referring to FIG. 6, when a ToolTip 602 is displayed, any other activity on the map screen may cancel the display of the ToolTip 602. Alternatively, certain additional activities may invoke various functions. For example, the ToolTip 602 may be moved by dragging the ToolTip 602 to reposition it. The user may have the ability to indicate which objects the user is interested in for a subsequent operation, e.g. zoom selected objects, report generation, etc. A script-writer may also be able to select an object and thus highlight it on a map. Further, the user may specify a layer, object ID, etc. to be displayed in a later cycle.

Figure 8:
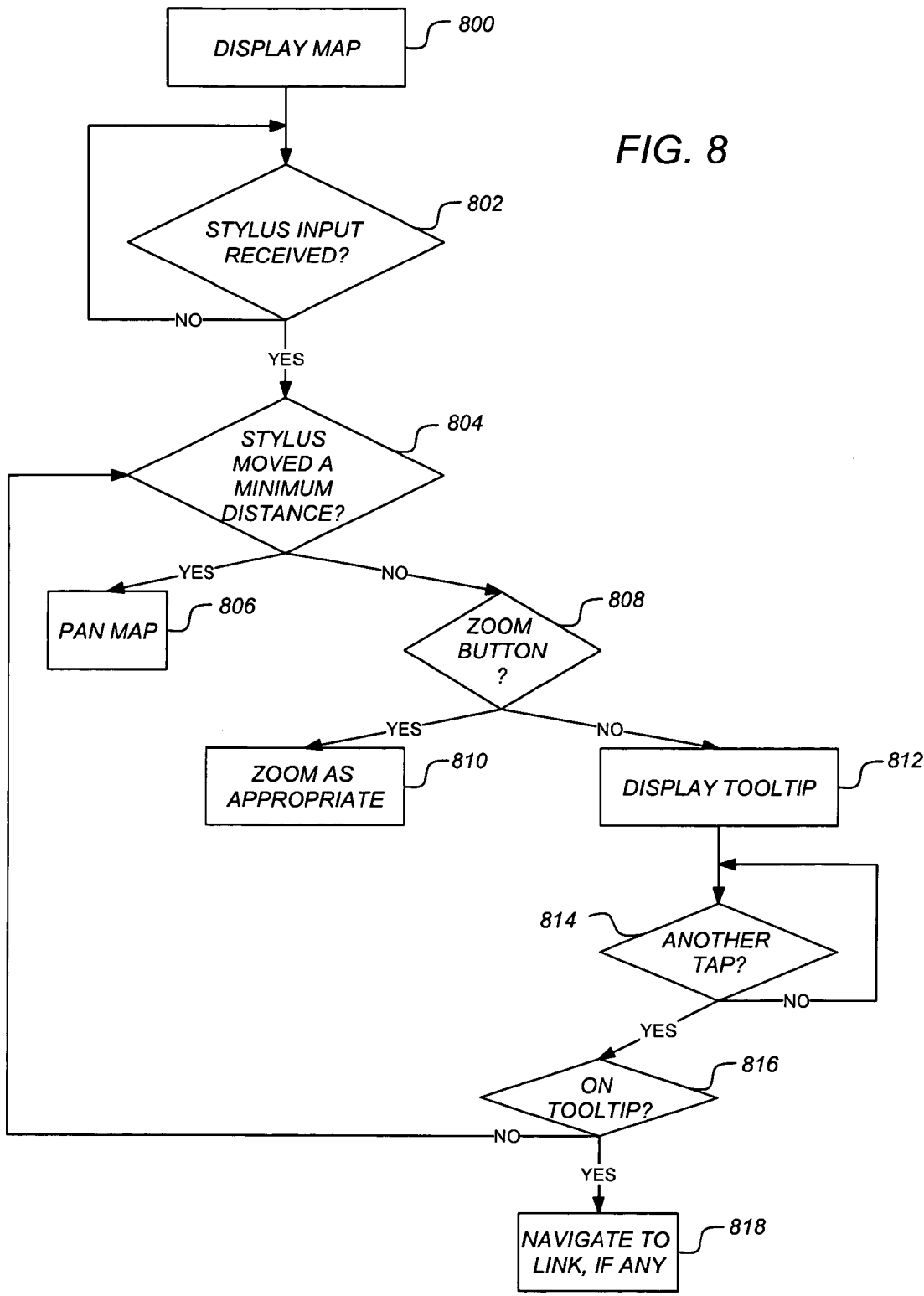
FIG. 8 is a flowchart illustrating map navigation through a graphical user interface in accordance with one or more embodiments of the invention.

FIG. 8 is a flowchart illustrating map navigation through a graphical user interface in accordance with one or more embodiments of the invention. At step 800, a map is displayed. At step 802, a determination is made regarding whether a single gesture input is received from a stylus. If a gesture is not received, no further action is needed. If a gesture is received, a determination is made regarding whether the stylus has been dragged a minimum distance at step 804. If the stylus has been dragged a minimum distance, it indicates that the user is attempting a pan operation. Accordingly, the map is panned based on the stylus drag at step 806. If the stylus was not dragged a minimum distance, it indicates that the user has attempted to tap a map object. At step 808, a determination is made regarding whether the user attempted to tap a zoom button. If so, the map is zoomed appropriately at step 810.

If a zoom button was not tapped, the ToolTip of the map object tapped is displayed at step 812. As described above, the ToolTip may contain the text or URL of the map object tapped. The map object closest to the tapped point may be utilized. If no map object is within a predefined distance of the tap, step 812 may not be performed.

Once a ToolTip has been displayed, the application may wait for further user action at step 814. Thus, at step 814, a determination is made regarding whether the user has tapped the map again. If a tap is received, the application determines whether the tap was on the displayed ToolTip or not at step 816. If the tap or user input was not on the ToolTip, processing may continue at step 804. Alternatively, the ToolTip may disappear from the display and processing may continue at step 802. If the tap was on the displayed ToolTip, the system may navigate the user to the link associated with the ToolTip, if any.

Servlet

Referring back to FIG. 1, a servlet 106 accommodates any additional processing needed by PDA thin client 102 and application 130. To take advantage of existing web servers 110 and servlet technology, servlet 108 may be implemented using the Java programming language. Alternatively, any programming language that performs/provides Java servlet like functionality may be utilized. Accordingly, a single code stream is utilized to implement the servlet 108 on multiple platforms. A minimum set of constraints beyond those provided by web server 110 and the servlet 108 framework provide scalability. For example, each client 102 request may be self-contained in that it is responded to by a different instantiation of the servlet 108.

Servlet 108 may reside in a web server 110 and responds to requests for spatial and attribute data related to map objects, from multiple thin clients 102. Servlet 108 processes the requests, performs the visualization and encoding and places the results in a location that is accessible to the thin clients 102. Additionally, servlet 108 may identify one or more maps included in a mapset, obtain the map data for the one or more maps identified from the server 106, and create the mapset comprised of the map data prior to receiving a request for the map data from a client 102. Such map data retrieval and mapset creation may be performed by servlet 108 in response to receiving a request relating to a work order (e.g., a request to modify, delete, or add a work order).

Additionally, servlet 108 may support the retrieval and creation of a mapset (i.e., map data) using multiple central processing units in parallel. To provide such parallel processing support, servlet 108 identifies one or more maps in a mapset, instantiates separate threads on multiple central processing units to obtain map data for the one or more maps from the server 106 in parallel, assembles a transient database comprised of the map data, and creates a mapset comprised of the map data using the transient database.

FIG. 2B illustrates the subcomponents of servlet 108. The request broker 224 listens to and coordinates requests from multiple clients 102 (i.e., from FIG. 2A), and conveys the requests to the query processor 230. The query processor 230 processes the query using services provided by the servlet resident viewer services component 232. Query processor 230 also uses the visualizer component 228 and encoder component 226 to perform cartographic decluttering and encoding of the data to be sent back to or retrieve by the client 102.

Map data on server 106 is comprised of multiple raster tile and vector object data for an object of the map data. Visualizer component 228 performs configurable decluttering of data in a manner that is appropriate to the display of thin client 102. Accordingly, visualizer 228 generalizes the shape of a vector object by filtering out some of the vector object data. Encoder component 226 compacts and encodes the objects being retrieved by thin client 102. Encoder component 226 differentially encodes a location of an object by encoding an offset for the location of the object with respect to an origin of the raster tile where the object is located. Further, encoder component 226 spatially indexes the vector object data by encoding the bounds of the object.

The raster tiles are stored in row major format. An index for each raster tile is stored following the raster tiles in an order corresponding to the storage of the raster tiles. The index comprises a reference to a record containing the generalized vector object data, and the offset and bounds for each raster tile.

By generalizing, encoding, and spatially indexing the map data, the thin client 102 may determine an object identified by a point by evaluating the bounds of one or more raster tiles to determine the raster tile containing the point, and evaluating the bounds of objects within the raster tile containing the point to determine which object contains the point.

Servlet resident viewer services components 232 represents the servlet resident part of viewer services (as described above with respect to FIG. 2A) and communicates with mapguide server 120. The map guide server 120 may be web server 110 or a component of server 106.

Figure 9:
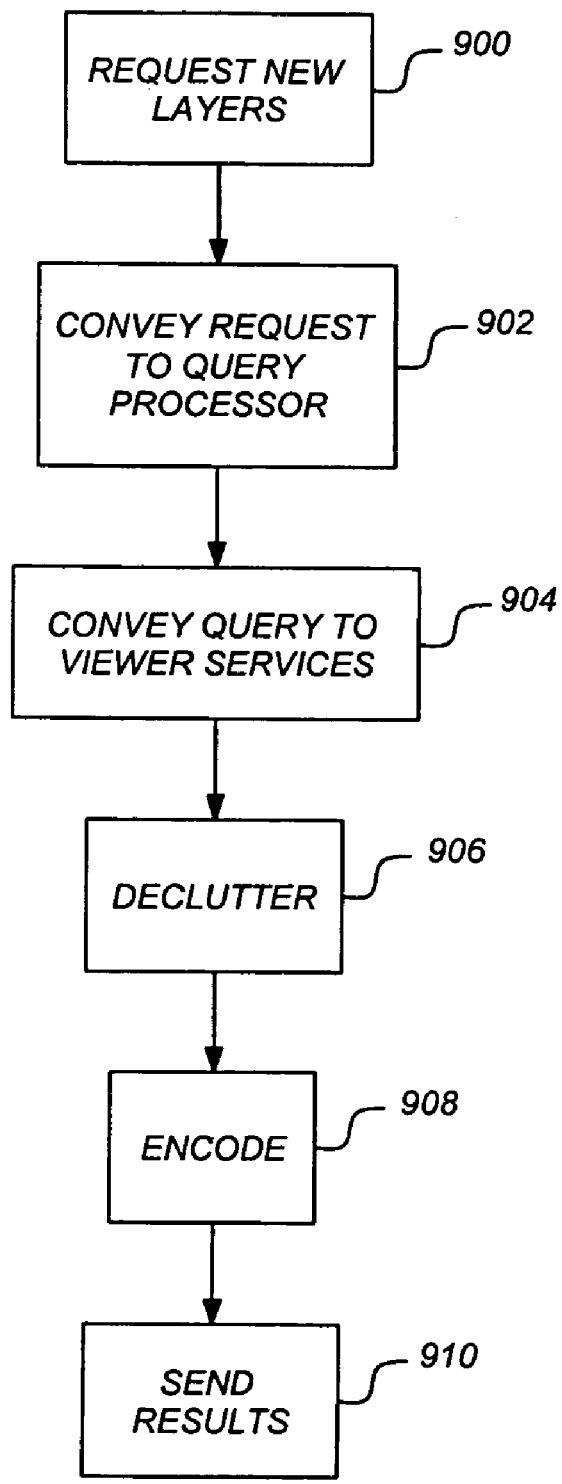
FIG. 9 is a flow chart illustrating how a servlet responds to requests from client net services in accordance with one or more embodiments of the invention.

FIG. 9 is a flow chart illustrating how servlet 108 responds to requests received through net services 218. Referring to FIGS. 2A, 2B, and 9, at step 900, net services 218 requests request broker 224 on servlet 108 to download new layers (for dynamic data). At step 902, the request broker 224 (after coordinating requests from other clients 102 if necessary) conveys the request to the query processor 230. The query processor 230 conveys the query to the servlet resident viewer services 232 and obtains the results at step 904. The results are decluttered (if specified) using the visualizer 228 at step 906 and encoded for compaction using the encoder 226 at step 908. The results (after visualization and encoding) or the location(s) where the results may be obtained are sent back to the client net services 218 at step 910.

Figure 10:
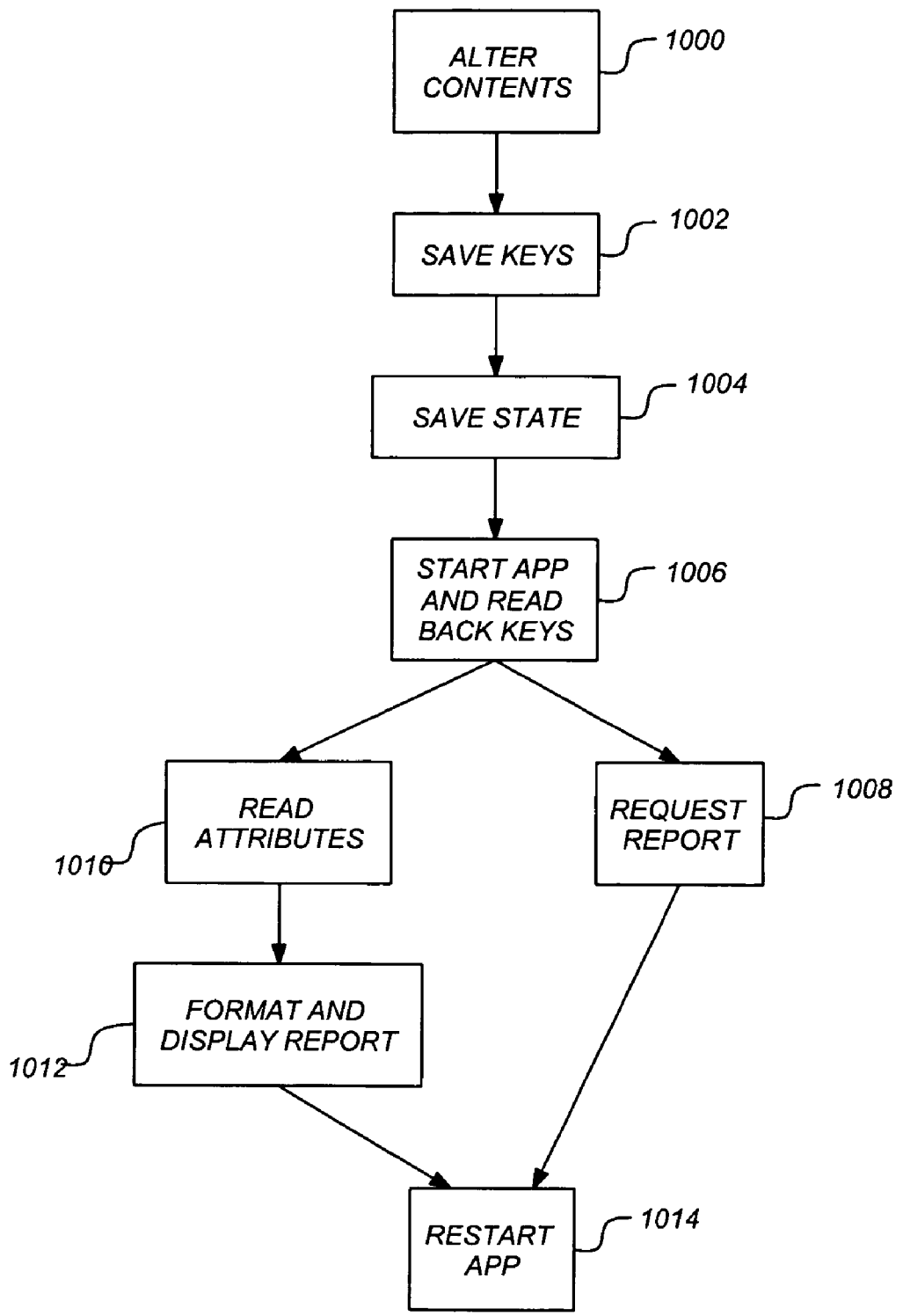
FIG. 10 is a flow chart illustrating how the client and servlet respond to requests to show reports (e.g., maps) in accordance with one or more embodiments of the invention.

FIG. 10 is a flow chart further illustrating how the client 102 and servlet 108 respond to requests to show reports (e.g., maps). Referring to FIGS. 2A, 2B, and 10, at step 1000, the user is given an opportunity to alter the contents of the selected map objects. At step 1002, the keys of the selected objects are saved to the PDA database 220. The state of the mapguide PDA 202 is saved to the PDA database 220 at step 1004. A report application (such as MapGuide PDA application 202) is started up and the keys of the selected objects are read back from the PDA database 220 at step 1006.

For local reports, the business attributes for the selected objects are read from the PDA database 220 at step 1010 and the report is formatted and displayed at step 1012. For reports that require more extensive formatting services (e.g., COLD FUSION Application Server) or require data not stored in the local PDA database 220, a request is issued to net services 218 (through synchronization application 238) to obtain the report at step 1008.

After the user is finished viewing the report, and possibly other reports linked to it, the mapguide PDA application 202 is re-started at step 1014 at which time the application 202 restores itself to its last saved state.

CONCLUSION

This concludes the description of one or more embodiments of the invention. The following describes some alternative embodiments for accomplishing the present invention.

For example, any type of personal digital assistant or computer, such as a mainframe, minicomputer, or personal computer, or computer configuration, such as a timesharing mainframe, local area network, standalone personal computer, WINCE device, etc. could be used with the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for map navigation using a graphical user interface on a personal digital assistant (PDA) comprising:
    displaying a map on a display screen of a PDA;
    receiving a single gesture input from a user into the PDA, wherein the single gesture input comprises a drag of a stylus across the display screen, and wherein the drag of the stylus allows the graphical user interface to distinguish between desired user operations;
    determining whether the stylus has been dragged a minimum distance; and
    if the stylus has been dragged a minimum distance and in response to the drag, panning the map in accordance with the drag such that the map is shifted to a new center view, wherein an edge of the map cannot be panned beyond a center of a view.

2. The method of claim 1 wherein the map may be panned until an edge of the map is reached.

3. The method of claim 1 wherein the panning returns a view of the map to a designated target point.

4. A method for map navigation using a graphical user interface on a personal digital assistant (PDA) comprising:
    displaying a map having one or more map objects on a display screen of a PDA;
    receiving a single gesture input from a user into the PDA, wherein the single gesture input comprises a single tap of a stylus on a specific map object, and wherein actions of the single gesture input allow the graphical user interface to distinguish between desired user operations; and
    in response to the single tap:
        selecting and highlighting the map object under the tap; and
        displaying a tooltip for the map object.

5. The method of claim 4 further comprising:
receiving a second single gesture input from a user into the PDA, wherein the second single gesture input comprises a single tap of the stylus on the tooltip; and
displaying a report for the map object in response to the single tap on the tooltip.

6. A method for map navigation using a graphical user interface on a personal digital assistant (PDA) comprising:
displaying a map on a display screen of a PDA;
displaying a zoom button on the display screen of the PDA;
receiving a single gesture input from a user into the PDA, wherein the single gesture input comprises a single tap by a stylus of the zoom button, and wherein actions of the single gesture input allow the graphical user interface to distinguish between desired user operations; and
displaying the map on the display screen of the PDA with a different level of detail.

7. The method of claim 6 wherein the different level of detail is a more detailed view of the map than originally displayed.

8. The method of claim 6 wherein the different level of detail is a less detailed view of the map than originally displayed.

9. The method of claim 6 wherein the zoom button is only displayed if a display of a different level of derail is available.

10. A system for navigating a map using a graphical user interface on a personal digital assistant (PDA) comprising:
(a) a personal digital assistant (PDA);
(b) an application launched on the PDA, the application configured to:
(i) display a map on a display screen of the PDA;
(ii) receive a single gesture input from a user into the PDA, wherein the single gesture input comprises a drag of a stylus across the display screen, and wherein the drag of the stylus allows the graphical user interface to distinguish between desired user operations;
(iii) determine whether the stylus has been dragged a minimum distance; and
(iv) if the stylus has been dragged a minimum distance and in response to the drag, pan the map in accordance with the drag such that the map is shifted to a new center view, wherein an edge of the map cannot be panned beyond a center of a view.

11. The system of claim 10 wherein the map may be panned until an edge of the map is reached.

12. A system for navigating a map using a graphical user interface on a personal digital assistant (PDA) comprising:
(a) a personal digital assistant (PDA);
(b) an application launched on the PDA, the application configured to:
(i) display a map having one or more map objects on a display screen of a PDA;
(ii) receive a single gesture input from a user into the PDA, wherein the single gesture input comprises a single tap of a stylus on a specific map object, and wherein actions of the single gesture input allow the graphical user interface to distinguish between desired user operations; and
(iii) in response to the single tap:
(1) select and highlighting the map object under the tap; and
(2) display a tooltip for the map object.

13. The system of claim 12, the application further configured to:
receive a second single gesture input from a user into the PDA, wherein the second single gesture input comprises a single tap of the stylus on the tooltip; and
display a report for the map object in response to the single tap on the tooltip.

14. A system for navigating a map using a graphical user interface on a personal digital assistant (PDA) comprising:
(a) a personal digital assistant (PDA);
(b) an application launched on the PDA, the application configured to:
(i) display a map on a display screen of a PDA;
(ii) display a zoom button on the display screen of the PDA;
(iii) receive a single gesture input from a user into the PDA, wherein the single gesture input comprises a single tap by a stylus of the zoom button, and wherein actions of the single gesture input allow the graphical user interface to distinguish between desired user operations; and
(iv) display the map on the display screen of the PDA with a different level of derail.

15. The system of claim 14 wherein the different level of detail is a more detailed view of the map than originally displayed.

16. The system of claim 14 wherein the different level of detail is a less detailed view of the map than originally displayed.

17. The system of claim 14 wherein the zoom button is only displayed if a display of a different level of detail is available.

18. An article of manufacture for navigating maps using a graphical user interface on a personal digital assistant (PDA) comprising:
means for displaying a map on a display screen of a PDA;
means for receiving a single gesture input from a user into the PDA, wherein the single gesture input comprises a drag of a stylus across the display screen, and wherein the drag of the stylus allows the graphical user interface to distinguish between desired user operations;
means for determining whether the stylus has been dragged a minimum distance; and
means for panning the map in accordance with the drag such that the map is shifted to a new center view if the stylus has been dragged a minimum distance, wherein an edge of the map cannot be panned beyond a center of a view.

19. The article of manufacture of claim 18 wherein the map may be panned until an edge of the map is reached.

20. An article of manufacture for navigating maps using a graphical user interface on a personal digital assistant (PDA) comprising:
means for displaying a map having one or more map objects on a display screen of a PDA;
means for receiving a single gestate input from a user into the PDA, wherein the single gesture input comprises a single tap of a stylus on a specific map object, and wherein actions of the single gesture input allow the graphical user interface to distinguish between desired user operations;
means for selecting and highlighting the map object under the tap in response to the single tap; and
means for displaying a tooltip for the map object in response to the single tap.

21. The article of manufacture of claim 20 further comprising:
- means for receiving a second single gesture input from a user into the PDA, wherein the second single gesture input comprises a single tap of the stylus on the tooltip; and
- means for displaying a report for the map object in response to the single tap on the tooltip.

22. An article of manufacture for navigating maps using a graphical user interface on a personal digital assistant (PDA) comprising:
- means for displaying a map on a display screen of a PDA;
- means for displaying a zoom button on the display screen of the PDA;
- means for receiving a single gesture input from a user into the PDA, wherein the single gesture input comprises a single tap by a stylus of the zoom button, and wherein actions of the single gesture input allow the graphical user interface to distinguish between desired user operations;
- means for displaying the map on the display screen of the PDA with a different level of detail.

23. The article of manufacture of claim 22 wherein the different level of detail is a more detailed view of the map than originally displayed.

24. The article of manufacture of claim 22 wherein the different level of detail is a less detailed view of the map than originally displayed.

25. The article of manufacture of claim 22 wherein the zoom button is only displayed if a display of a different level of detail is available.

26. A method for map navigation using a graphical user interface on a personal digital assistant (PDA) comprising:
- (a) displaying a map on a display screen of a PDA;
- (b) receiving a single gesture input from a user into the PDA;
- (c) evaluating the single gesture input to determine if a stylus has been dragged across a display screen a distance;
- (d) if the stylus has been dragged at least the minimum distance;
  - (i) determining that a user desires to conduct a panning operation; and
  - (ii) panning the map in accordance with the drag such that the map is shifted to a new center view; and
- (e) if the stylus has not been dragged the minimum distance:
  - (i) determining that the user desired to conduct a map object selection operation in a form of a single tap of the stylus on a specific map object; and
  - (ii) performing a map object selection operation based on the specific map object tapped.

27. The method of claim 26 wherein the map object selection operation comprises displaying a tooltip for the specific map object tapped.

28. The method of claim 26 wherein:
the specific map object comprises a zoom button; and
the map object selection operation comprises displaying the map on the display screen of the PDA with a different level of detail.

* * * * *

UNITED STATES PATENT AND TRADEMARK OFFICE
CERTIFICATE OF CORRECTION

| | | |
|---|---|---|
| PATENT NO. | : 7,142,205 B2 | Page 1 of 1 |
| APPLICATION NO. | : 09/795890 | |
| DATED | : November 28, 2006 | |
| INVENTOR(S) | : Nemmara Chithambaram et al. | |

It is certified that error appears in the above-identified patent and that said Letters Patent is hereby corrected as shown below:

Claim 14, line 23, delete "derail" and insert --detail--;

Claim 26, line 8, before "distance" insert --minimum--.

Signed and Sealed this

Fourth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,142,205 B2 | Page 1 of 1 |
| APPLICATION NO. | : 09/795890 | |
| DATED | : November 28, 2006 | |
| INVENTOR(S) | : Nemmara Chithambaram et al. | |

It is certified that error appears in the above-identified patent and that said Letters Patent is hereby corrected as shown below:

Column 18 Claim 14, line 23, delete "derail" and insert --detail--;

Column 20 Claim 26, line 8, before "distance" insert --minimum--.

This certificate supersedes the Certificate of Correction issued March 4, 2008.

Signed and Sealed this

Twenty-fifth Day of March, 2008

JON W. DUDAS
*Director of the United States Patent and Trademark Office*